United States Patent
Sanders et al.

(10) Patent No.: US 6,738,857 B2
(45) Date of Patent: *May 18, 2004

(54) COMBINED SINGLE-ENDED/DIFFERENTIAL DATA BUS CONNECTOR

(75) Inventors: Michael C. Sanders, Spring, TX (US); Stephen F. Contreras, Spring, TX (US); John T. Spencer, Houston, TX (US); Morrel O. Jones, III, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/237,422

(22) Filed: Sep. 9, 2002

(65) Prior Publication Data

US 2003/0041204 A1 Feb. 27, 2003

Related U.S. Application Data

(63) Continuation of application No. 09/248,760, filed on Feb. 12, 1999, now Pat. No. 6,449,680.

(51) Int. Cl.$^7$ ................................................. G06F 13/00
(52) U.S. Cl. ...................................... 710/316; 710/305
(58) Field of Search ............................... 710/305, 316, 710/62, 63, 100, 101; 326/30

(56) References Cited

U.S. PATENT DOCUMENTS

| | | | |
|---|---|---|---|
| 5,099,137 A | 3/1992 | Lattin, Jr. ................. 307/147 |
| 5,352,123 A | 10/1994 | Sample et al. ................. 439/61 |
| 5,536,176 A | * 7/1996 | Borchew et al. ............... 439/61 |
| 5,602,717 A | 2/1997 | Leshem et al. ............... 361/685 |
| 5,603,039 A | 2/1997 | Strevey ....................... 395/750 |
| 5,621,899 A | 4/1997 | Gafford et al. ............... 395/299 |
| 5,671,376 A | 9/1997 | Bucher et al. ................ 395/309 |
| 5,684,966 A | 11/1997 | Gafford et al. ............... 395/309 |
| 5,715,409 A | 2/1998 | Bucher et al. ............... 395/309 |
| 5,758,109 A | 5/1998 | Gafford et al. ............. 395/308 |
| 5,809,256 A | 9/1998 | Najemy ....................... 395/283 |
| 5,864,715 A | 1/1999 | Zani et al. ................... 395/883 |
| 5,883,804 A | 3/1999 | Christensen ............. 364/400.01 |
| 5,925,120 A | 7/1999 | Arp et al. ..................... 710/131 |
| 5,974,490 A | * 10/1999 | Fujimura et al. ............ 710/302 |
| 5,978,877 A | 11/1999 | Strevey ....................... 710/128 |
| 6,003,096 A | 12/1999 | Lee ............................... 710/1 |
| 6,065,079 A | 5/2000 | Dupuy ......................... 710/101 |
| 6,067,506 A | 5/2000 | Goldys et al. ............... 702/117 |
| 6,141,021 A | * 10/2000 | Bickford et al. ............ 345/503 |
| 6,154,799 A | 11/2000 | Gafford et al. ............. 710/107 |
| 6,205,532 B1 | * 3/2001 | Carvey et al. ................. 712/1 |
| 6,260,155 B1 | 7/2001 | Dellacona ....................... 714/4 |
| 6,449,680 B1 | * 9/2002 | Sanders et al. ............. 710/316 |
| 6,527,560 B2 | * 3/2003 | Yang ............................. 439/43 |

* cited by examiner

*Primary Examiner*—Xuan M. Thai

(57) ABSTRACT

A computer system with various component modules with each of the modules interconnected with a single midplane board, thereby eliminating the need for ribbon cables to interconnect between the modules. One of the modules includes an embedded controller and associated data bus. An in-line connector is coupled in the data bus which receives either a jumper connector or interconnect connector. The interconnect connector intercepts the data bus from the embedded controller and transfers connection to a user added controller. The interconnect connector can operate in two modes, a single mode and a differential mode. The interconnect connector includes logic circuitry that determines the type of controller connected and places the interconnect connector in the appropriate mode. If the logic circuitry detects that a single-ended controller is connected to the interconnect connector, a quick switch, which is connected to one wire of the data bus, is closed, thereby grounding the one wire. If the logic circuitry detects that a differential controller is connected to the interconnect connector, the quick switch places the quick switch in an open position, disconnecting the one wire of the data bus from ground.

21 Claims, 3 Drawing Sheets

COMBINED SINGLE-ENDED/DIFFERENTIAL DATA BUS CONNECTOR

This application is a Continuation of application Ser. No. 09/248,760, filed Feb. 12, 1999 now U.S. Pat No. 6,449,680.

FIELD OF THE INVENTION

The present invention relates to a data bus connector, and more particularly, but not by way of limitation, to a SCSI data bus connector that can operate either as a single-ended connector or a differential connector, and can reconnect a data bus originally connected to an embedded controller to an user added controller.

BACKGROUND OF THE INVENTION

Today's businesses are becoming more and more dependent upon computer systems, including network computer systems, for their day-to-day operations As can be appreciated, the requirement for minimum down-time of these computer systems is imperative, especially in network computer systems, where many users can be affected when a single component in the systems fails.

Some of the existing computer technologies have started utilizing "hot pluggable" components in the computer system. One such example is redundant power supplies, whereby if one supply fails or needs replacing, the power to the computer system is maintained by the second power supply, and the computer system does not need to be powered down while the other power supply is being repaired or replaced In addition to hot pluggablility, modularity of components is also being implemented. For example, a multiprocessor computer system will have all of the processors implemented into a single module, the media components implemented into another module, and the input/output components implemented into still another module. In this type of computer system each of the individual modules can be removed from the computer chassis for maintenance or upgradability. An example of one such computer system is described in patent application entitled "Computer Chassis Assembly with a Single Center Pluggable Midplane Board", invented by Kurt Manweiler, Mike Sanders and Tom Hardt, filed on the same day herewith, and assigned to Compaq Computer Corp., which is incorporated in its entirety herein. In this computer system, a processor module, media module, I/O module and power supplies are all interconnected with a single center pluggable midplane board. It is designed so that no ribbon cables are required to interconnect any of the modules In the I/O module, an embedded Ultra2 SCSI (LVD) interface is utilized to help minimize the form factor of the computer chassis. However, one problem with an embedded SCSI interface arises when a user wants to implement a SCSI controller other than the embedded one. A ribbon cable is needed to connect the added SCSI controller with the corresponding drives to be controlled. The ribbon cable would have to traverse the midplane board, thereby defeating the advantages of the modularity of the computer system. Additionally, if the added SCSI is of a different type, the existing data bus may not be compatible Therefore, as can be appreciated there is a need for a interconnect connector that can implement a user added controller rather than an embedded controller without using cables that cross the module boundaries, and that is also backward compatible with other types of controllers

SUMMARY OF THE INVENTION

The present invention overcomes the above identified problems as well as other shortcomings and deficiencies of existing technologies by providing a connector that can be connected directly into the data bus and that can reconnect the data bus with a user added controller, and is further backward compatible with other versions of controllers.

The present invention further provides a computer system with various component modules. The modules are interconnected with a single midplane board, which eliminates the need for ribbon cables to interconnect between the modules. One of the modules includes an embedded controller and associated data bus. An in-line connector is coupled in the data bus which receives either a jumper connector or an interconnect connector. The interconnect connector intercepts the data bus from the embedded controller and transfers connection to a user added controller. The interconnect connector can operate in three modes, a single ended mode, a LV differential mode, and an HV differential mode The interconnect connector includes logic circuitry that determines the signaling environment and places the interconnect connector in the appropriate mode. If the logic circuitry detects a non LVD signaling environment, a quick switch, which is connected to one wire of each data bus pair, is closed, thereby grounding the one wire on each pair. If the logic circuitry detects an LV differential signaling environment, the quick switch places the quick switch in an open position, disconnecting the one wire of each pair of the data bus from ground.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
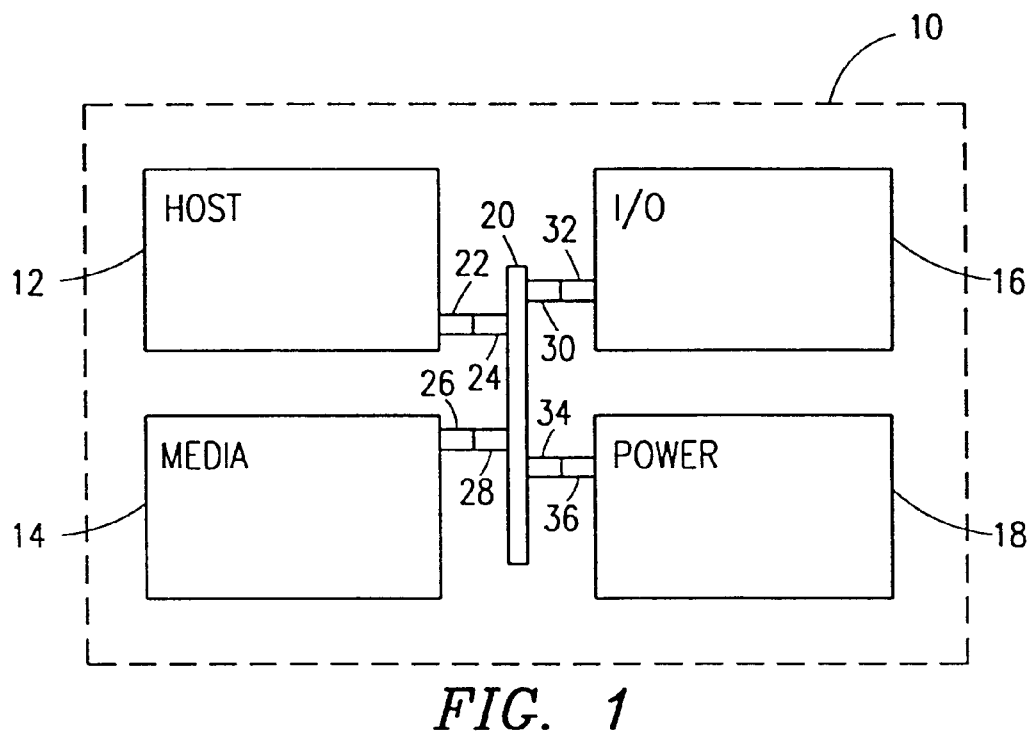
FIG. 1 is a block diagram illustrating a computer system in accordance with the principles of the present invention.

Referring now to the drawings wherein like or similar elements are designated with identical reference numerals throughout the several views, and wherein the various elements depicted are not necessarily drawn to scale, and further where the purpose of the block diagrams is to illustrate, among other things, the features of the present invention and the basic principles of operation thereof.

Referring now to FIG. 1, there is illustrated a block diagram illustrating a computer system 10 in accordance with the principles of the present invention. As illustrated, computer system 10 includes multiple component modules, such as host module 12, media module 14, I/O module 16, and power supply module 18. Each of the modules 12–18 are interconnected through a single midplane board 20. As is illustrated, connector 22 of host module 12 is directly connected to connector 24 of midplane board 20, connector 26 of media module 14 is connected to connector 28 of midplane board, connector 32 of I/O module 16 is connected to connector 30 of midplane board 20, and connector 36 of power supply module 18 is connected to connector 34 of midplane board 20.

Still referring to FIG. 1, computer system 10 is designed such that each of the modules 12–18 are interconnected through center midplane board 20, and is further designed such that no cables cross from one module's boundary to another. This among other things, helps to minimize the form factor of the computer system chassis, as well as provides easy removal and insertion of any of the modules 12–18.

Figure 2:
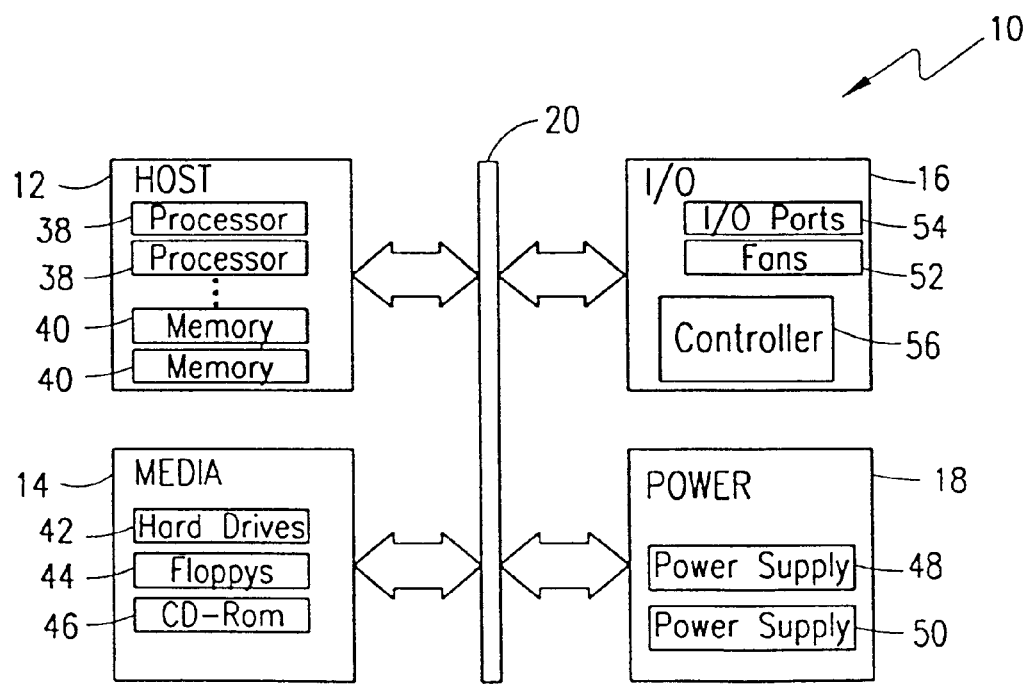
FIG. 2 is a block diagram illustrating in more detail the computer system as similarly shown in FIG. 1, FIG. 3 a block diagram illustrating in more detail an exemplary embodiment of the I/O module as similarly shown in FIG. 2.

Referring now to FIG. 2, there is illustrated a block diagram illustrating in more detail the modules 12–18 of computer system 10. As illustrated, in an exemplary embodiment of computer system 10, host module 12 includes multiple host processors 38, and memory modules 40; media module 14 includes media hardware, such as floppy disk drives 42, hard disk drives 44, and CD-ROM drives 46; I/O module 16 includes cooling fans 52, standard I/O ports 54, which includes parallel and serial ports, an embedded controller 56, and multiple peripheral option card slots (see FIG. 3); and power module 18 includes two hot pluggable power supplies 48 and 50. Each of these modules is directly plugged into the center midplane board 20 and are interconnected therethrough.

Figure 3:
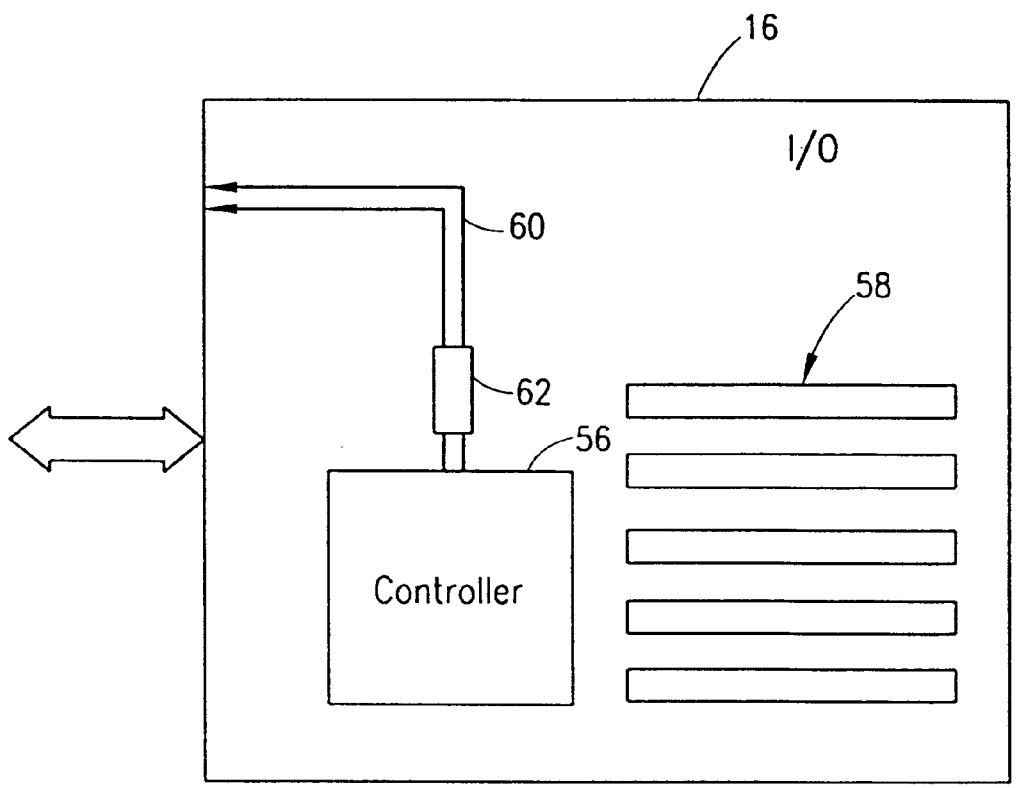

Referring now to FIG. 3, there is illustrated a more detailed diagram of I/O module 16. As depicted, I/O module 16 includes controller 56 and I/O expansion slots 58 for receiving peripheral options cards. Controller 56 is embedded in module 16 and is connected to data bus 60. Data bus 60 carries the data signals to the center midplane board 20, and ultimately to the corresponding module and devices to the controller. The embedded controller 56 and data bus 60 maintain a small form factor for the computer system 10 by eliminating the need to connect ribbon cables between the controller 56 in the I/O module 16 and the corresponding module with the hardware being controlled thereby.

In one exemplary embodiment, controller 56 and data bus 60 are in the form of an Ultra2 SCSI Low Voltage Differential (LVD) interface. In normal operation, the Ultra2 SCSI (LVD) interface utilizes a pair of wires to carry each signal that needs to be send across the bus. The first wire carries the same type of signal as a typical single-ended SCSI interface, while the second wire carries the logical inversion of the signal. The receiver of the two signals takes the differential of the pair to obtain the sent data. Currently, Ultra2 SCSI (LVD) is capable of achieving transfer rates of up to 80 MB/sec.

Still referring to FIG. 3, removable jumper connector 62 is in-line with data bus 60. If a user desires to utilize a different controller than embedded controller 56, removable jumper connector 62 can be removed and replaced with a connector (see FIGS. 4–6) to connect with a different controller, such as one added in one of the expansion slots 58. Because the industry dictates that SCSI interfaces be backward compatible, just replacing jumper connector 62 with a typical connector can create many problems, especially if the added controller is a single-ended SCSI controller.

Figure 4:
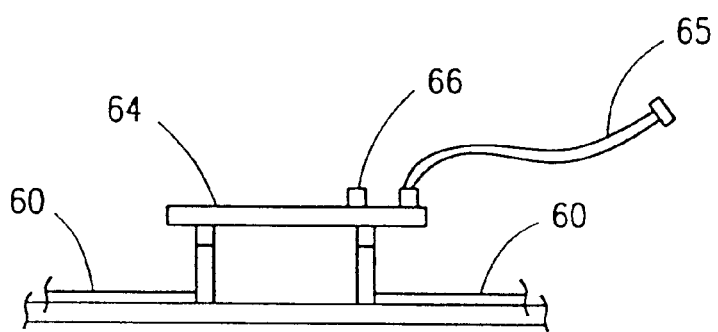
FIG. 4 is a side view with portions cut away illustrating an exemplary embodiment of a connector in accordance with the principles of the present invention.

Referring now to FIG. 4, there is illustrated a side view of a connector 64, in accordance with the principles of the present invention that can operate both as an Ultra2 SCSI (LVD) connector, i.e. it is a differential connector, as well as can operate with backward compatible SCSI connectors, i.e. a single-ended connector. As depicted, connector 64 is connected to the data bus 60, and includes a ribbon cable 65 for connection of connector 64 to the option card with the added controller. Connector 64 further includes logic circuitry 66 that controls the mode of operation of connector 64, whether it is operating as a differential connector, or operating as a single-ended connector. Connector 64 permits the addition of a controller to the computer system 10 without the need to run a ribbon cable from the I/O module 16, across or around the center midplane board 20, to the corresponding device to be controlled, such as a disk drive.

Figure 5:
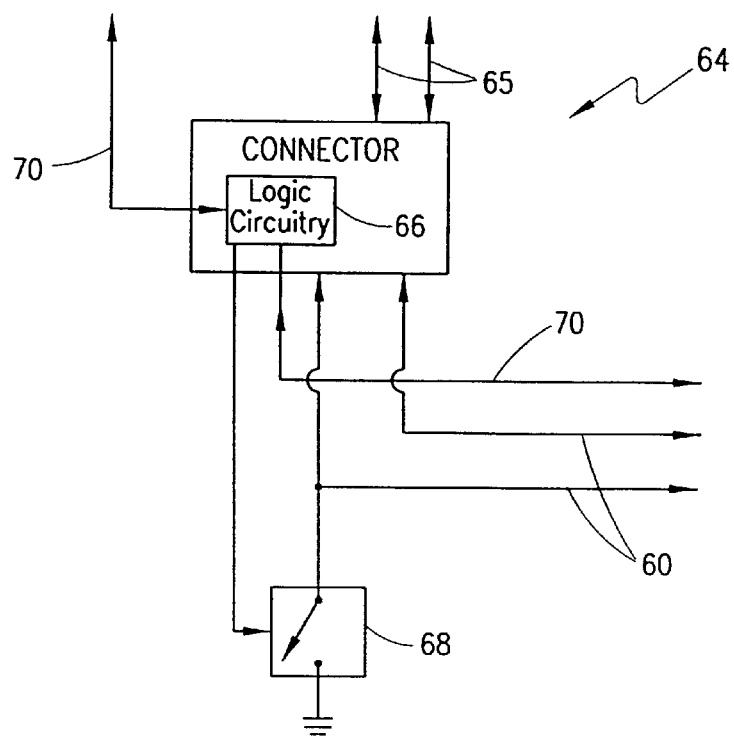
FIG. 5 is a schematic block diagram illustrating an exemplary embodiment of a connector with a switch in a first position in accordance with the principles of the present invention.
Figure 6:
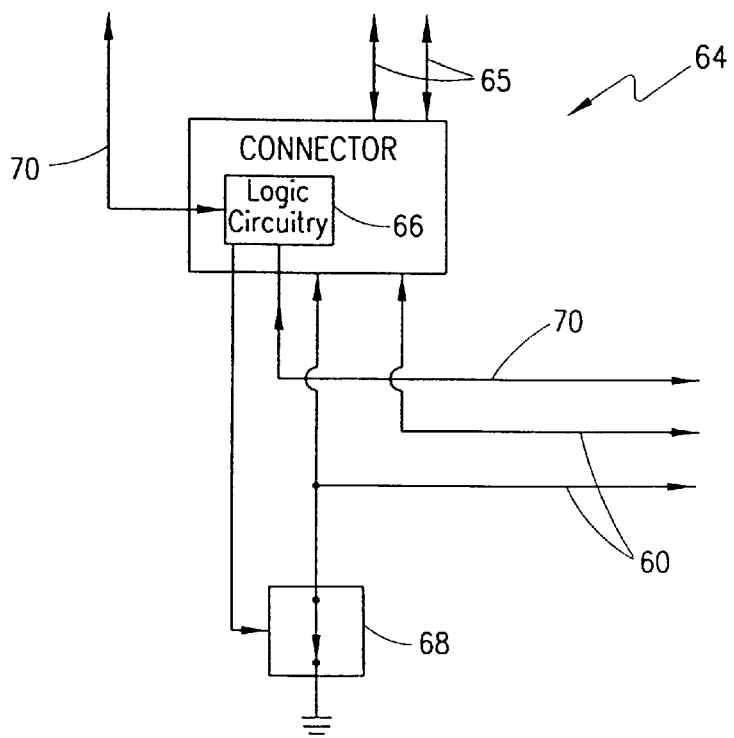
FIG. 6 is a schematic block diagram illustrating an exemplary embodiment of a connector with a switch in a second position in accordance with the principles of the present invention.

Referring now to FIGS. 5 and 6, there is illustrated a schematic block diagram of the connector 64 configured to operate as a differential (LVD) connector (FIG. 5), and as a single ended connector (FIG. 6). As depicted connector 64 includes logic circuitry 66, a quick switch 68 and sensing line 70. The connector 64 is connected to the differential wire pair of the data bus 60. When the connector 64 is installed, logic circuitry 66 detects, through sense line 70, the signal environment voltages levels being utilized. Based upon the voltage levels, the logic circuitry 66 configures connector 64 as a single ended or differential connector. If logic circuit 66 detects that the signal environment is LVD, the logic circuitry 66 places quick switch 68 into the open state, thereby permitting both wires of data bus 60 to be used as an LVD data bus (FIG. 5). If logic circuit 66 detects that the signal environment is not LVD, the logic circuitry 66 places quick switch 68 into the closed position, thereby grounding one of the wires of data bus 60 and configuring connector as a single ended connector (FIG. 6).

Although connector 64 is illustrated as only interfacing with a single SCSI bus signal, i.e. a pair of wires, it is contemplated to be within the scope of this invention that the connector 64 could be configured to interface with any number of SCSI bus pairs, such as in a parallel Ultra SCSI interface, such that when operating, quick switches are used to ground one signal line of every differential pair if the detected signal environment is not LVD.

Therefore, as can be appreciated by one of ordinary skill in the art, the above described invention provides a computer system with various component modules. The modules are interconnected with a single midplane board, which eliminates the need for ribbon cables to interconnect between the modules. One of the modules includes an embedded controller and associated data bus. An inline connector is coupled in the data bus which receives either a jumper connector or interconnect connector. The interconnect connector intercepts the data bus from the embedded controller and transfers connection to a user added controller. The interconnect connector can operate in three modes, a single ended mode, an LV differential mode and an HV differential mode. The interconnect connector includes logic circuitry that determines the signaling environment and places the interconnect connector in the appropriate mode If the logic circuitry detects a non LVD signaling environment, a quick switch, which is connected to one wire of the data bus, is closed, thereby grounding the one wire of the data bus If the logic circuitry detects an LV differential signaling environment, the quick switch places the quick switch in an open position, disconnecting the one wire of the data bus from ground.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system, comprising:

a center midplane board;

a plurality of component modules, each of the plurality of component modules directly connected to the center midplane board, with a first of the plurality of component modules including a media storage device;

a first controller embedded in a second of the plurality of component modules, the first controller for controlling the media storage device;

a second controller removably disposed in the second component module;

a data bus connectable between at least the second component module and one of the first controller and the second controller; and the data bus having a region to selectively receive a first connector and a second connector, the first connector connecting the data bus between the first controller and the second component module, the second connector connecting the data bus between the second controller and the second component module.

2. The computer system as recited in claim 1, wherein the first connector is a jumper connector.

3. The computer system as recited in claim 1, wherein the second connector comprises logic circuitry for detecting the type of signaling environment.

4. The computer system as recited in claim 3, wherein the second connector comprises a switch connected to the logic circuitry and the data bus, the switch for connecting a data conductor of the data bus to ground in response to the logic circuitry detecting that the signaling environment is a select type.

5. The computer system as recited in claim 1, wherein the second connector is a combined single-ended and differential connector.

6. The computer system as recited in claim 1, wherein the data bus is a small computer system interface bus.

7. A computer system, comprising:

a plurality of modules electrically coupled to each other through a board;

an embedded controller disposed on one of the plurality of modules; and a data bus coupled to the embedded controller, the data bus having a replaceable connector that may be removed to transfer connection from the embedded controller to an alternate controller.

8. The computer system as recited as claim 7, further comprising an interconnect connector that may be substituted for the replaceable connector.

9. The computer system as recited in claim 7, wherein the replaceable connector comprises a jumper connector.

10. The computer system as recited in claim 7, wherein the data bus comprises a small computer system interface bus.

11. The computer system as recited in claim 8, wherein the interconnect connector comprises a combined single-ended and differential connector.

12. A method for providing a user with the option of changing a controller in a computer system, comprising:

mounting an embedded controller into a computer system module;

connecting the embedded controller with a component via a data bus having a connector region; and providing a removable connector in the connector region to permit removal of the connector for changing control to an alternate controller.

13. The method as recited in claim 12, wherein providing comprises providing a jumper cable.

14. The method as recited in claim 12, further comprising replacing the removable connector with an interconnect connector to couple the alternate controller to the component.

15. The method as recited in claim 12, wherein connecting comprises connecting via a small computer system interface bus.

16. The method as recited in claim 12, further comprising pluggably coupling the computer system module to a midplane.

17. The method as recited in claim 16, further comprising pluggably connecting a plurality of other modules to the midplane.

18. A system for providing a user with the option of changing a controller in a computer system, comprising:

means for mounting a module with an embedded controller in a computer system;

means for connecting the embedded controller with a component via a data bus having a connector region; and means for providing a removable connector in the connector region to permit removal of the connector for changing control to an alternate controller.

19. The system as recited in claim 18, wherein the means for mounting comprises a midplane.

20. The system as recited in claim 18, wherein the means for connecting comprises a small computer system interface bus.

21. The system as recited in claim 18, wherein the means for providing comprises a jumper cable.

* * * * *